United States Patent
Franz et al.

(10) Patent No.: US 8,170,853 B2
(45) Date of Patent: *May 1, 2012

(54) METHOD OF MODELING THE TIME GRADIENT OF THE STATE OF A STEEL VOLUME BY MEANS OF A COMPUTER AND CORRESPONDING OBJECTS

(75) Inventors: Klaus Franz, Nürnberg (DE); Matthias Kurz, Erlangen (DE); Klaus Weinzierl, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 868 days.

This patent is subject to a terminal disclaimer.

(21) Appl. No.: 11/989,178

(22) PCT Filed: Jul. 13, 2006

(86) PCT No.: PCT/EP2006/064183
§ 371 (c)(1),
(2), (4) Date: Jan. 22, 2008

(87) PCT Pub. No.: WO2007/014831
PCT Pub. Date: Feb. 8, 2007

(65) Prior Publication Data
US 2009/0265146 A1    Oct. 22, 2009

Related U.S. Application Data

(63) Continuation-in-part of application No. 10/499,742, filed as application No. PCT/DE03/03542 on Oct. 24, 2003, now Pat. No. 7,449,140.

(30) Foreign Application Priority Data

Aug. 1, 2005 (DE) .......... 10 2005 036 068

(51) Int. Cl.
G06G 7/58 (2006.01)
(52) U.S. Cl. .......................................................... 703/12
(58) Field of Classification Search .................... 703/12
See application file for complete search history.

(56) References Cited

U.S. PATENT DOCUMENTS 7,449,140 B2 * 11/2008 Franz et al. ............... 266/96
2005/0016712 A1    1/2005 Franz et al.

FOREIGN PATENT DOCUMENTS

RU         2067904 C1    10/1996

(Continued)

OTHER PUBLICATIONS

International Application Status Report for WO2004/042480; Feb. 16, 2011; pp. 1-2.*

(Continued)

*Primary Examiner* — Hugh Jones (57) ABSTRACT

A steel volume is modeled in a computer by means of a plurality of volume elements. The state of the steel volume at a given time comprises, for each volume element, characteristic quantities of an enthalpy existing at said time in the respective volume element and percentages, in which the steel is available in the respective volume element at the time in austenite, ferrite and cementite phases. For at least one volume element, the computer determines the time gradient of the characteristic quantities by resolving thermal conductivity and phase transition equations. One of the characteristic quantities is a locally invariable mean interstitial element concentration within the volume element in the austenite phase thereof.

18 Claims, 5 Drawing Sheets

FOREIGN PATENT DOCUMENTS

| RU | 2078626 C1 | 5/1997 |
|---|---|---|
| RU | 2183522 C1 | 6/2002 |
| WO | WO 01/91943 A1 | 12/2001 |
| WO | WO 03/060754 | 7/2003 |

OTHER PUBLICATIONS

DE 102 51 716.9 Nov. 6, 2002; pp. 1-35.*

Reti et al., "Computer simulation of steel quenching process using a multi-phase transformation model", Computational Materials Science Elseview Netherlands, Dec. 2001, p. 264, vol. 22, No. 3-4, XP002403410, ISSN: 0927-0256.

Quidort et al., "Isothermal growth kinetics of bainite in 0.5% C steels", Acta Materialia Elsevier UK, Dec. 2001, pp. 4161-4170, vol. 49, No. 20, XP002403484, ISSN: 1359-6454.

* cited by examiner

FIG 6

$$\frac{\partial e}{\partial t} - \frac{\partial}{\partial x}\left[\frac{\lambda}{\rho} \cdot \frac{\partial T}{\partial x}\right] = \frac{\partial Q}{\partial t}$$

$$\frac{dpA}{dt} = f_1 \text{ (Stefan problem)} \qquad \frac{dcA}{dt} = f_2 \text{ (Stefan problem)}$$

FIG 7

For at least one volume element 14, determine the Gibbsean free enthalpies of the phases austenite, ferrite and cementite

↓

Determine on the basis of the Gibbsean free enthalpies and the proportions pA, pF, pZ of the phases austenite, ferrite and cementite conversion rates of the phases austenite, ferrite and cementite

↓

Determine on the basis of the conversion rates of the phases austenite, ferrite and cementite and the proportions pA, pF, pZ of the phases austenite, ferrite and cementite the proportions pA, pF, pZ of the phases austenite, ferrite and cementite

FIG 8

Determine for at least one volume element 14 an austenite region and a distribution of the concentration of carbon in the austenitic region of the respective volume element

↓

On the basis of the ratio of the austenitic region and the volume element determine the overall proportion pA of the austenite phase in the respective volume element

↓

By averaging the concentration of carbon determine the average carbon concentration cA in the austenitic region

METHOD OF MODELING THE TIME GRADIENT OF THE STATE OF A STEEL VOLUME BY MEANS OF A COMPUTER AND CORRESPONDING OBJECTS

CROSS REFERENCE TO RELATED APPLICATIONS

This application is a continuation-in-part application of U.S. application Ser. No. 10/499,742 now U.S. Pat. No. 7,449,140 which is the US national stage application of International application no. PCT/DE03/03542 filed Oct. 24, 2003. International application no. PCT/DE03/03542 claims the benefits of German patent application 102 51 716 DE filed Nov. 6, 2001. This application is the U.S. National Stage of International Application No. PCT/EP2006/064183 filed Jul. 13, 2006, and claims the benefit thereof. The International Application claims the benefits of German application No. 10 2005 036 068.8 DE filed Aug. 1, 2005. All of the applications are incorporated by reference herein in their entirety.

FIELD OF INVENTION

The present invention initially relates to a method of modeling the time gradient of the state of a steel volume by means of a computer,
  with the steel volume being modeled in the computer through a number of volume elements,
  with the state of the steel volume at a specific point in time including variables for each of the volume elements which are characteristic of an enthalpy present at this point in time in the respective volume element and that are characteristic for components in which the steel is present in the respective volume element at this point in time in the phases austenite, ferrite and cementite,
  with the computer determining for at least one of the volume elements the time gradient of the characteristic variables by solving a thermal conductivity equation and a phase transition equation.

The present invention then relates to a data medium with a computer program stored on the data medium for executing a modeling method of this type and a computer with mass storage device in which the computer program is stored, so that the computer executes a modeling method of this type when the computer program is called.

Finally the present invention also relates to an influencing device for influencing the temperature of an actual steel volume, especially a cooling line, which is controlled by one of these types of computer, as well as steel which has passed through such an influencing device.

BACKGROUND OF INVENTION

Types of modeling methods and the corresponding objects are known. The reader is referred for example to the applicant's DE-B4-101 29 565 and especially to DE-B3-102 51 716.

In process automation of the handling of steel the modeling of the metal temperature has particular significance. In such cases it is basically of no consequence whether the modeling of the metal temperature is undertaken in relation to a steel volume which is located in an oven or is passing through a rolling process or a cooling process for example. Phase transitions which can also occur with metals within the fixed phase make computation with the thermal conductivity equation difficult in such cases. If an accurate computation is required, the phase transition must be included in the determination of the time gradient of the state of the metal volume.

With steel in particular the phase transition only occurs after a delay since the temperature changes occurring are so large that the transition cannot follow the temperature change. Frequently this is caused by alloying elements which are added to the steel.

The reason for this delayed transition lies—in steel for example—in the presence of carbon in the steel. This is because, although carbon dissolves relatively well in austenite, it only dissolves to a very small, practically negligible extent in ferrite. This delays phase transitions from austenite to ferrite since the carbon in the austenite must first diffuse out before ferrite can form.

Austenite can also form a further phase, namely cementite. Cementite together with ferrite forms a mixed phase which is also referred to as pearlite. At first sight it appears completely unclear and almost hopeless to take such a complicated process into account correctly in a thermal conductivity equation.

In the prior art the following solutions have been initially attempted:
  The modeling of the phase transition has been greatly simplified.
  The modeling of the phase transition was undertaken in an advance computation with an approximated temperature gradient. The phase transition was then fixed. Exothermic processes in the phase transition were taken into account by heat sources in the Fourier thermal conductivity equation. However this coupling of the phase transition in the form of heat sources to the Fourier thermal conductivity equation only appears to solve the problem. A more precise consideration actually shows that the approach is physically incorrect. This is especially evident from the fact that parameters are to be set separately for the heat sources, which is not required for a correct solution.

An already significantly improved approach is known from DE-B4-101 29 565, in which the thermal conductivity equation is correctly applied. The phase transition equation is however only valid for a two-phase system (e.g. the austenite-ferrite system). An expansion to a three-phase system (e.g. the austenite-ferrite-cementite system) is not easily possible. Also the variables thermal conductivity and temperature occurring there in the thermal conductivity equation are only dependent on the enthalpy and a phase component. The dependence on a phase component is sufficient in such cases since because of the observation of a pure two-phase system there, the second phase component is implicitly produced from the situation that the sum of the two phase components must be one.

In DE-B3-102 51 716, also cited above, the thermal conductivity and the temperature are functions which depend on the enthalpy and the components of all phases considered. In a three-phase system, e.g. the austenite-ferrite-cementite system mentioned in DE-B3-102 51 716, the thermal conductivity and the temperature are thus functions which depend on the enthalpy and all phases.

Attempts to implement the two last-mentioned steps have actually led to significantly better results than previously. However discrepancies have occurred between the behavior of the steel volume determined in accordance with the modeling method and the actual behavior of a corresponding actual steel volume.

SUMMARY OF INVENTION

An object of the present invention consists of creating a method of modeling of type specified at the start of this document and of creating the corresponding objects by means of which a higher-quality modeling of the steel volume is possible is, while simultaneously keeping down the computing effort required for this.

The object is achieved by one of the characteristic variables being a locally-invariable average concentration of interstitial elements within the respective volume element in the phase austenite of the respective volume element. Interstitial elements are in such cases elements which on absorption in iron occupy intermediate grid locations. Examples of interstitial elements are carbon and nitrogen. The opposite of interstitial elements are substitutional elements. The elements replace iron atoms at their grid locations. Examples of substitutional elements are manganese and nickel.

In reality the concentration of interstitial elements in the phase austenite is location-dependent. In precise terms the exact distribution of interstitial elements in the phase austenite would thus have to be taken into account within the framework of the modeling method. This procedure leads however to very great computing outlay, but has practically no effect on the quality of the modeling.

Preferably further characteristic variables are the enthalpy itself and the proportion of the austenite phase in the respective volume element. in particular it is not necessary to explicitly use the phase components as parameters.

This is because, if pA, pF and pZ are used labels for the proportions of the austenite, ferrite and cementite phases in the respective volume element, then the following equation applies $$pF+pA+pZ=1. \tag{1}$$

if furthermore cA, cF and cZ are used a labels for the respective locally-invariable average concentration of interstitial elements within the respective volume element in the phases austenite, ferrite and cementite in the respective volume element and c is used as a label for the overall proportion of interstitial elements in the respective volume element, then the following equation also applies $$cFpF+cApA+cZpZ=c. \tag{2}$$

The overall proportion c of interstitial elements in the steel can in this case simply be viewed as constant. Since furthermore the average concentration cF of interstitial elements in phase ferrite is known to be almost zero, it can be practically ignored in equation 3. The value cZ for cementite is also a known constant, namely 0.25. The equation 3 can thus be simplified to $$cApA+0.25pZ=c \tag{3}$$

There are thus five variables in equations 1 and 3, namely the proportions pA, pF and pZ of phases austenite, ferrite and cementite as well as the locally-invariable average concentration cA of interstitial elements in the phase austenite and the overall proportion c of interstitial elements in the steel. When three independent variables of these five are specified the two remaining variables are thus able to be determined immediately and directly uniquely.

On the basis of equation 3 in particular the proportion pZ of the phase cementite is produced immediately $$pZ=4(c-cApA). \tag{4}$$

On the basis of equation 1 the proportion pF of ferrite in the at least one volume element is thus also determined immediately.

This procedure especially makes it possible to determine the phase proportions pF and pZ of the phases ferrite and cementite in the respective volume element and thereby to determine all relevant input parameters without having to undertake divisions. The avoidance of divisions in particular has the advantage of enabling the increased computing effort for executing divisions to be avoided and also means that no specific provisions have to be made for the case in which the divisor assumes the value zero. Furthermore inaccuracies are avoided which otherwise occur because of the need to divide by small values in individual cases.

Yet it is still possible in a simple manner for the computer within the framework of solving the thermal conductivity equation and/or within the framework of solving the phase transition equation, for the at least one volume element, to determine a relationship between the enthalpy and the temperature and, in doing so, to take into account that the relationship between the enthalpy and the temperature depends on the concentration of interstitial elements in the austenite phase of the respective volume element.

This is because in the prior art there have previously been attempts to determine the relationship between the enthalpy and the temperature on the basis of the equation $$e=pAeA(T)+pFeF(T)+pZeZ(T) \tag{5},$$

with eA, eF and eZ being functions which describe a relationship between the enthalpy and the temperature in the at least one volume element for the case in which the volume element is exclusively present in the austenite, ferrite or cementite phase. Although this procedure is correct in terms of its approach, it does not take account however of the fact that the relationship between the enthalpy and the temperature in the austenite phase is also dependent on the concentration of interstitial elements in the austenite phase. By contrast, in the present invention, this dependency can easily be taken into account in the function eA.

Preferably the computer already determines before the modeling of the time gradient of the state of the steel volume for a plurality of values of the characteristic variables the relationship between the enthalpy and the temperature and stores it as a checkpoint field. This is because this makes it possible for the computer within the framework of the modeling of the time gradient of the state of the steel volume to determine the temperature obtaining in the at least one volume element on the basis of the checkpoint field. This is because the computing effort for solving the thermal conductivity equation and the phase transition equation can be greatly reduced. The advance determination is only made possible in this case by the concentration of interstitial elements to be applied within the at least one volume element as locally invariable.

In a similar way it is also possible for the computer, even before the modeling of the time gradient of the state of the steel volume for a plurality of values of the characteristic variables, to determine a relationship between the enthalpy and the thermal conductivity and store them as a checkpoint field. This is because this makes it possible for the computer, within the framework of the modeling of the time gradient of the state of the steel volume, to determine thermal conductivity obtaining in the at least one volume element with reference to the checkpoint field.

Theoretically it is also possible with the thermal conductivity to take account of a dependency of the thermal conductivity in the austenite phase of the concentration of interstitial elements in the austenite phase. In practice however these effects are however often negligible.

It is of advantage for the thermal conductivity equation in the multidimensional case or one-dimensional case to take the form $$\frac{\partial e}{\partial t} - div\left[\frac{\lambda}{\rho} \cdot gradT\right] = \frac{\partial Q}{\partial t} \text{ or } \frac{\partial e}{\partial t} - \frac{\partial}{\partial x}\left[\frac{\lambda}{\rho} \cdot \frac{\partial T}{\partial x}\right] = \frac{\partial Q}{\partial t}$$

In this case λ is the thermal conductivity of the at least one volume element, ρ is the density of the steel and Q is a quantity of heat which is created in the at least one volume element by external influences. The quantity of heat created by outside influences in the at least one volume element in this case does not contain any components which are based on phase transitions.

The approach for the thermal conductivity equation has the advantage that the temperature changes caused by the thermal conductivity and by phase transition can be correctly modeled.

Different procedures for solving the phase transition equation are possible. For example it is possible for the computer, within the framework of solving the phase transition equation, to determine the Gibbsean free enthalpies of the phases austenite, ferrite and cementite on the basis of the Gibbsean free enthalpies. Conversion rates of the phases austenite, ferrite and cementite and on the basis of the conversion rates the proportions pA, pF and pZ of the phases austenite ferrite and cementite are determined. This procedure is for example described in detail in DE-B3-102 51 716.

Alternatively it is also possible for the computer within the framework of solving the phase transition equation by solving at least of one Stefan problem for the at least one volume element, to determine an austenitic region and a distribution of a concentration of the interstitial elements in the austenitic region of the at least one volume element and the overall proportion of the austenite phase is determined based on the ratio of the austenitic region and the at least one volume element.

This procedure is described in detail in the older German Patent Application DE 10 2004 005 919.5 not published as of the date of application of the applicant's present application. In such a case the average concentration of interstitial elements in the austenite phase can be determined by averaging the distribution of the concentration of interstitial elements in the austenitic region of the at least one volume element.

The inventive modeling method can be executed offline. Especially because it avoids unnecessary divisions and provides the opportunity to determine the temperature and the thermal conductivity in advance as multidimensional checkpoint fields, it is however also possible for the computer to execute the modeling process online and in realtime with the passage of a corresponding actual steel volume through an influencing device for thermal influencing of the actual steel volume.

The influencing device is as a rule embodied as a cooling line for the steel volume. It would however also be possible for the influencing device to be embodied as a rolling frame for the steel volume.

It is possible for the computer to only undertake the modeling as such but not to make any control interventions. This can be sensible for example for testing and optimizing the modeling method. In many cases it will however be the case of the computer, while applying the modeling method, determining process management variables for explicit influencing of the state of the actual steel volume and transferring them to the influencing device.

Preferably the computer is supplied with an actual temperature of the actual steel volume detected after the thermal influencing of the actual steel volume. This is because the computer is then in a position to compare the actual temperature with the corresponding temperature determined within the framework of the modeling method and to adapt the modeling method if required.

BRIEF DESCRIPTION OF THE DRAWINGS

Further advantages and details emerge from the subsequent description of an exemplary embodiment in conjunction with the drawings. The figures show the following basic diagrams:

FIG. 1 a computer schematic,
FIG. 2 a flowchart,
FIG. 3 a schematic of an influencing device and a computer,
FIG. 4 a scheme for determining a relationship between the enthalpy and the temperature,
FIGS. 5 and 6 a combination of a thermal conductivity equation with a phase transition equation,
FIGS. 7 and 8 possible implementations of a step of FIG. 2 and
FIG. 9 a further flowchart.

DETAILED DESCRIPTION OF INVENTION

Figure 1:
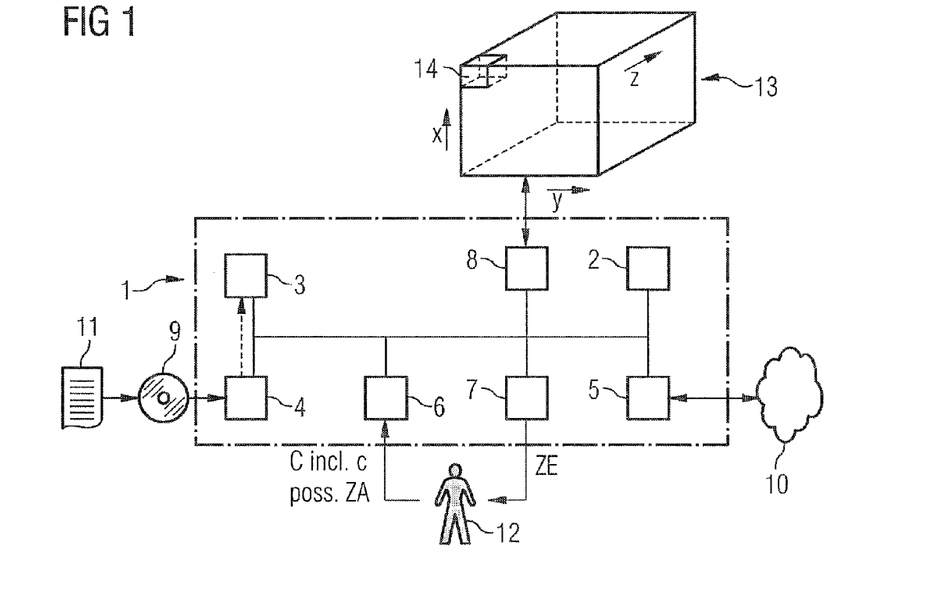

In accordance with FIG. 1 a computer 1 has the usual components 2 to 8. These are firstly a processor unit 2 and a mass storage device 3. The mass storage device 3 can for example be embodied as a hard disk. There are also interfaces 4 and 5. Interface 4 is an interface for connecting to the computer 1 a data medium 9 embodied as a removable medium. Depending on the embodiment of the interface 4 the data medium 9 can be embodied for example as a CD-ROM or as a USB memory stick. Interface 5 is an interface to a computer network 10, e.g. to the Internet or World Wide Web. The further components 6 to 8 of the computer 1 are an input device 6, an output device 7 and random access memory 8. The input device 6 can for example be a keyboard and a mouse. The output device 7 can be a terminal and a printer.

A computer program 11 is stored on the removable medium 9. After the removable medium 9 is connected to the interface 4 of the computer 1, the computer program 11 is read out The read out computer program 11 is stored by the computer 1 in the mass storage 3. When the computer program 11 is called—for example because of corresponding entries made by a user 12 via the input device 6—the computer 1 thus executes a modeling method which is described in greater detail below.

Using the modeling method the time gradient of the state Z of a steel volume 13 is to be modeled. This is done by the steel volume 13 being modeled in the computer 1—more precisely in its random access memory 8—by a number of volume elements 14. As a rule in such cases the steel volume 13 is modeled by a plurality of volume elements 14 which adjoin each other. In the individual case however it is also possible for the steel volume 13 to be modeled by only a single volume element 14.

If the steel volume 13 is modeled by a number of adjacent volume elements 14, the arrangement of the volume elements 14 can alternately be one-dimensional, two-dimensional or three-dimensional. The most common case here is the three-dimensional arrangement. A two-dimensional arrangement of the volume elements 14 arises for example if the behavior of a corresponding actual steel volume 13' is to be modeled, which is embodied in bar form, for example a billet 13' or another profile. This is because in these cases the heat flow in the direction of the bar is practically negligible. A one-dimensional arrangement of the volume elements 14 especially arises if the actual steel volume 13' is strip-shaped. This is because in this case a heat flow across the strip and along the strip is practically negligible. Only in the strip thickness direction does a significant heat flow occur.

The state of an individual volume element 14 at a specific time t includes the enthalpy e of the respective volume element 14 and the proportions pA, pF, pZ of the austenite, ferrite and cementite phases in the respective volume element 14 or of variables e, pA, cA characteristic of these proportions. Corresponding to this the state Z of the steel volume 13 at this time t includes the totality of the states of all volume elements 14 of the modeled steel volume 13.

The time gradient of the state Z of the steel volume 13 depends on a plurality of parameters. One of the parameters is the chemical composition C of the steel. The chemical composition C includes items such as an overall proportion c of interstitial elements. This composition is thus fed to the computer 1 in accordance with FIG. 2 in a step S1.

The chemical composition C can for example be predetermined by a corresponding entry of the user 12. It can however also be predetermined for the computer 1—see FIG. 3—by a higher-ranking process control computer 15 via a suitable computer-computer interface 15'.

The interstitial element occurring most frequently in steel is carbon. Therefore, for reasons of brevity, carbon will always be referred to below even if the interstitial elements in general are meant by this.

Figure 2:
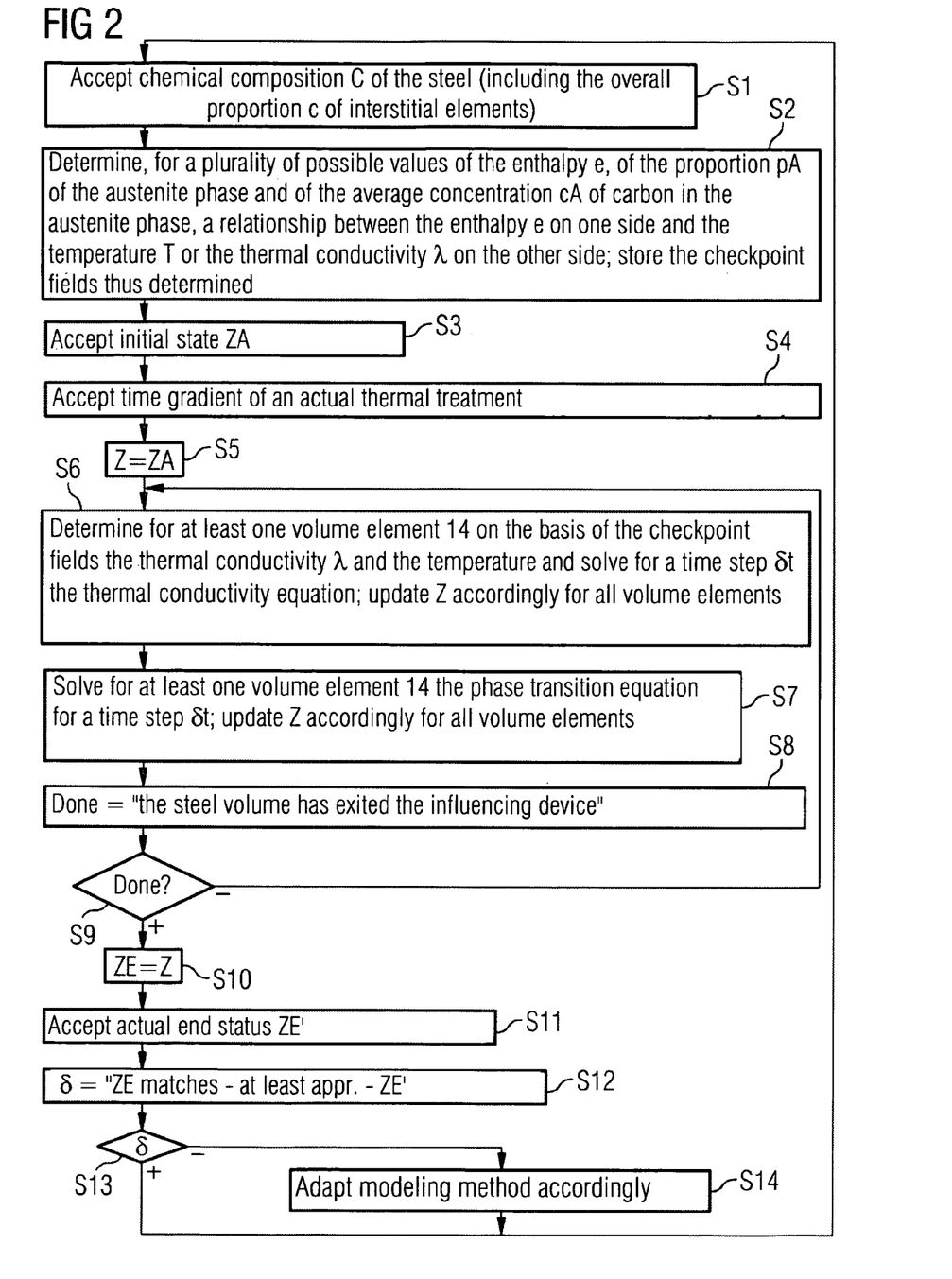

In a step S2—i.e. even before the solution of the thermal conductivity equation and the phase transition equation—the computer 1 then determines two multidimensional checkpoint fields for the thermal conductivity $\lambda$ of the steel and for the temperature T of the steel. The checkpoint fields thus have at least three input parameters, namely the enthalpy e of the respective volume element 14 and two variables pA, cA. One characteristic variable is the proportion pA, in which the steel is present in the respective volume element 14 in the austenite phase. The other characteristic variable is the locally invariable average carbon concentration cA in the austenite phase of the respective volume element 14 within of the respective volume element 14.

The overall proportion of carbon c of the steel is temporally constant for a given chemical composition C of the steel and is the same for all volume elements 14. Because of the relationships between the phase components pA, pF, pZ, the overall proportion of carbon c and the average carbon concentration cA in the austenite phase, it is a simple matter to determine the further phase proportions pF, pZ of the ferrite and cementite phases in the respective volume element 14.

The computer 1 thus determines in step S2 for a plurality of possible values of the Enthalpy e, of the proportion pA of the austenite phase and the average carbon concentration cA in the austenite phase of the respective volume element 14 the corresponding temperature T and the corresponding thermal conductivity $\lambda$ of the volume element 14. A functional relationship is thus produced between the enthalpy e on the one hand and the temperature T or the thermal conductivity $\lambda$ on the other hand. This checkpoint fields will be stored. They can thus be evaluated later very quickly within the framework of the solution of the thermal conductivity equation by linear interpolation or non-linear interpolation (e.g. by means of multidimensional B-splines).

Preferably the computer 1, when determining the relationship between the enthalpy e and the temperature T, takes account of the average carbon concentration cA in the austenite phase as such, i.e. not only to determine the proportions pF and pt.

Figure 4:
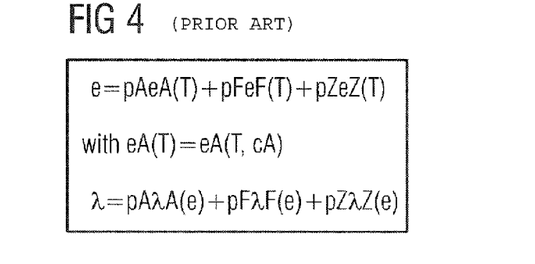

The relationship between the enthalpy e and the temperature T is determined in accordance with FIG. 4, namely preferably on the basis of the formula $$e = pAeA(T) + pFeF(T) + pZeZ(T) \quad (6)$$

In this case eA, eF and eZ are functions that in each case describe a relationship between the enthalpy e and the temperature T in the volume elements 14. eF in this case describes the relationship in the event of the volume element 14 exclusively being present in the ferrite phase. Similarly eZ describes the relationship in the event of the volume element 14 exclusively being present in the cementite phase. The functions eF and eZ are not dependent on the average carbon concentration cA in the austenite phase of the volume element 14. The function eA on the other hand, which describes the relationship between the enthalpy e and the temperature T in the event of the volume element 14 being present in the austenite phase, is dependent as such on the average carbon concentration cA in the austenite phase. This dependency is thus taken into account in the function eA in accordance with FIG. 4.

If one wished to calculate with absolute precision, it would even be necessary to apply the carbon concentration in the austenite phase within the respective volume element 14 at variable locations. But then it would no longer be possible, for the temperature T, to determine said temperature in advance in the form of a checkpoint field. In this case the determination of the temperature T would have to be undertaken within the framework of the modeling of the time gradient of the state Z of the steel volume 13 itself. This procedure would also demand a significant computing effort. For this reason the carbon concentration cA in the austenite phase is applied as locally invariable within of the volume element 14 observed in each case.

The checkpoint field for the thermal conductivity $\lambda$ is determined in accordance with FIG. 4 in a similar way with reference to the equation $$\lambda = pA\lambda A(e) + pF\lambda F(e) + pZ\lambda Z(e) \quad (7)$$

$\lambda A$, $\lambda F$ and $\lambda Z$ in this case are functions which each describe a relationship between the enthalpy e and the thermal conductivity $\lambda$ in the volume element 14 in the event of the volume element 14 being exclusively present in the austenite, ferrite or cementite phase. In precise terms the function $\lambda A$ is likewise dependent on the average carbon concentration cA in the austenite phase of the respective volume element 14. It is thus possible to take account of this dependency accordingly if necessary. In many applications the influence of the average carbon concentration cA in the austenite phase of the respective volume element 14 is only slight however and can in be ignored in its practical effects.

In a step S3 the computer 1 then accepts an initial state ZA of the steel volume 13. Within the framework of a pure offline modeling—see FIG. 1—it is for example possible for this initial state ZA to be specified to the computer 1 by the user 12 via the input device 6. On the other hand, if the modeling method is executed online—possibly even in realtime—with the passage of a corresponding actual steel volume 13' by an influencing device 16 for influencing the actual steel volume 13' (see FIG. 3)—the specification is made using an appropriate measuring device 17, which is arranged at the start of the influencing device 16. In both cases however the initial state ZA corresponds to the state of the corresponding actual steel volume 13' on entry into the influencing device 16.

Figure 3:
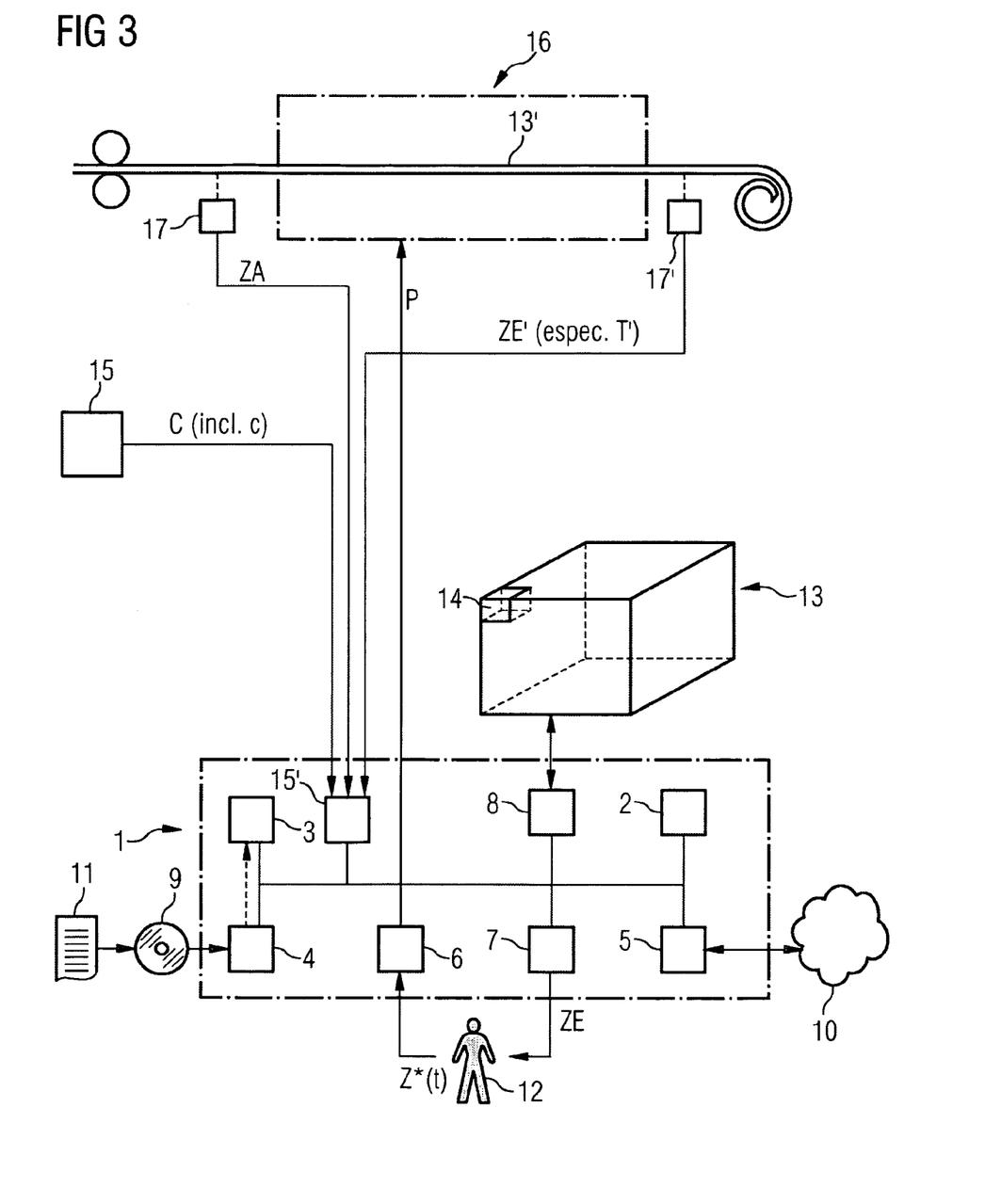

In a step S4 the computer 1 continues to accept the peripheral conditions. For example the time gradient with which the actual steel volume 13' will actually be thermally handled on its passage through the influencing device 16 can be prespecified to the computer 1. If the influencing device 16, which is the normal case, is embodied for example as a cooling line 16, the time gradient of the actual thermal influencing of the steel volume corresponds to the time gradient of the cooling of the actual steel volume 13'. If the influencing device 16 (in exceptional cases) is to be embodied as a rolling line, the thermal influencing corresponds to the rolling processes undertaken on the actual steel volume 13', minus the cooling process on passage through the rolling line.

In steps S5 to S10 the computer 1 then determines the time gradient of the state Z of the modeled steel volume 13.

In the ideal case this is done by the computer 1 solving individually for each volume element 14 of the modeled steel volume 13 a thermal conductivity equation and a phase transition equation, and in this way determining the time gradient of the characteristic variables e, pA, cA. In the minimal case this is done by the computer 1 solving the thermal conductivity equation and the phase transition equation for just one of the volume elements 14 and then transferring the state determined for this one volume element 14 to all other volume elements 14 of the modeled steel volume 13. This is because this last-mentioned procedure also leads to the result of the computer 1 defining for each volume element 14, and each point in time t the enthalpy e of the respective volume element 14, the phase proportion pA and the concentration cA—and thereby implicitly also the phase proportions pF and pZ.

A practice a middle way is often adopted in which the thermal conductivity equation is solved individually for each volume element 14 but the phase transition equation only for an individual volume element 14 or only for a part of the volume elements 14, for example every eighth (8=2³) or every 27th. (27=3³) volume element 14. In each case however the computer 1, in step S5, sets the current state Z of the modeled steel volume 13 equal to the initial state ZA of the steel volume 13 supplied in step S3. Then the computer 1 in step S6 for a time step δt solves the thermal conductivity equation for at least one of the volume elements 14. Furthermore the computer 1 in step S7 for the same time step δt solves the phase transition equation for at least one of the volume elements 14. Where required, the results determined will be transferred for the other volume elements 14. To be on the safe side it should also be mentioned that the sequence of steps S6 and S7 is irrelevant.

Figure 5:
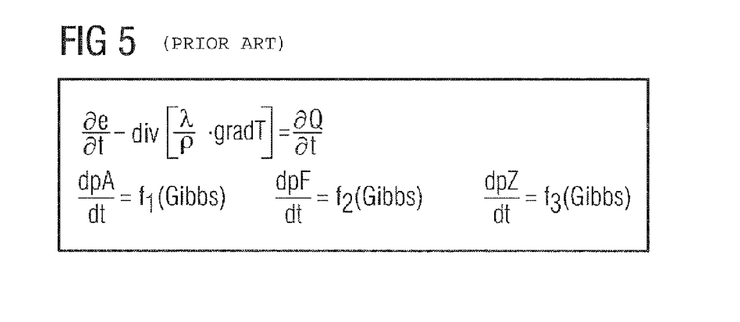

The thermal conductivity equation can—depending on the type of modeled steel volume 13 or 13'—be solved as a multidimensional or one-dimensional equation. If the thermal conductivity equation is solved as a multidimensional equation it has the following form as depicted in FIG. 5.

$$\left(\frac{\partial e}{\partial t} - div\left[\frac{\lambda}{\rho} \cdot gradT\right]\right) = \frac{\partial Q}{\partial t} \tag{5}$$

In this equation t is the time, ρ the density of the steel and Q the volume of heat created by outside influences in the volume element 14 observed. It does not contain any amounts which stem from phase transitions. div and grad are the usual mathematical operators divergence and gradient.

If the thermal conductivity equation is solved as a one-dimensional equation, in equation 5 the mathematical operators divergence and gradient are replaced by the one-dimensional location derivation. x is in this case the location coordinate of the one dimension. The thermal conductivity equation is thus simplified in accordance with FIG. 6 to $$\frac{\partial e}{\partial t} - \frac{\partial}{\partial x}\left[\frac{\lambda}{\rho} \cdot \frac{\partial T}{\partial x}\right] = \frac{\partial Q}{\partial t}. \tag{6}$$

Figure 6:
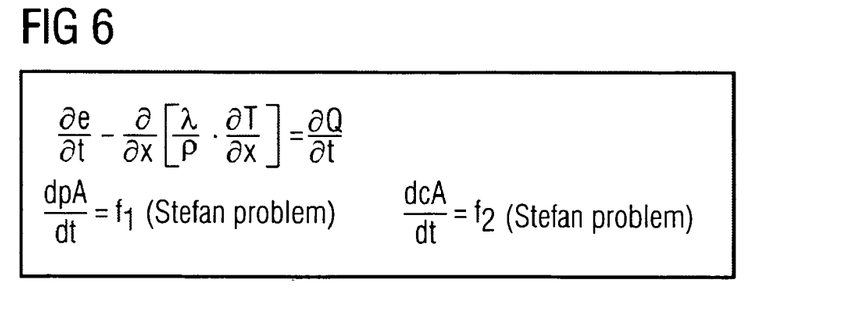

This simplification is permissible if the timing behavior of a steel strip is to be modeled. This is because in such a case the heat flow along the strip and across the strip is negligible. There is only a significant heat flow through the thickness of the strip.

Regardless of whether the thermal conductivity equation is solved multidimensionally or one-dimensionally, the computer 1, to solve the thermal conductivity equation (step S6) and the phase transition equation (step S7), determines in accordance with FIGS. 5 and 6 the respective thermal conductivity λ produced and the respective temperature T produced on the basis of the checkpoints determined in step S2. The concrete values for the thermal conductivity λ and the temperature T can be determined in this case for example by linear interpolation or by an interpolation with smooth curves—keyword multidimensional splines.

If an even more precise determination of the temperature T is demanded, it is possible to also take into account a surface energy. In this case the state of a volume element 14 also includes a number n of the pearlite layers formed or deposited in the observed volume element 14 at the respective time t, also the number of ferrite-cementite-ferrite-cementite layers . . . . Naturally a variable equivalent to these in size can be included.

The number n produces in connection with the change of the proportion pA of the austenite phase in the observed volume element 14 a change of the surface energy contained in the observed volume element 14. The enthalpy e will in this case be corrected by the change in the surface energy and the temperature T then defined with reference to the corrected value of the enthalpy e.

The correction by the surface energy can, since the surface energy is independent of the temperature T, be taken into account quickly and simply as an offset. Alternatively it could naturally also be taken into account by the checkpoint field for the temperature T containing as a further dimension the change in the surface energy or also the number n of the layers.

Figure 7:
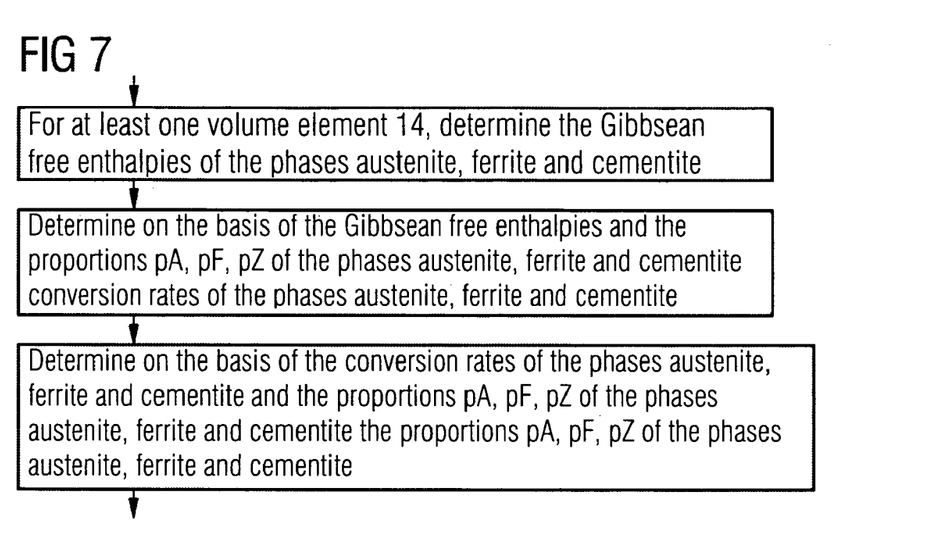

The phase transition equation can in principle be designed in any way. It is important that the computer 1 within the framework of solving phase transition equation, explicitly determines the characteristic variables pA, cA and thereby also implicitly determines the proportion pA, pF and pZ of the steel present in the observed volume element 14 in the phases austenite, ferrite and cementite. This can, as indicated in FIG. 4 occur for example by the computer 1 determining, within the framework of solving the phase transition equation, the Gibbsean free enthalpies of the austenite, ferrite and cementite phases. On the basis of the Gibbsean free enthalpies the computer 1 then determines conversion rates of the austenite, ferrite and cementite phases. On the basis of the conversion rates the computer 1 finally determines the proportions pA, pF, pZ of the austenite, ferrite and cementite phases. This implementation is shown schematically in FIG. 7. It thus represents one possible embodiment of step S7 of FIG. 2.

Figure 8:
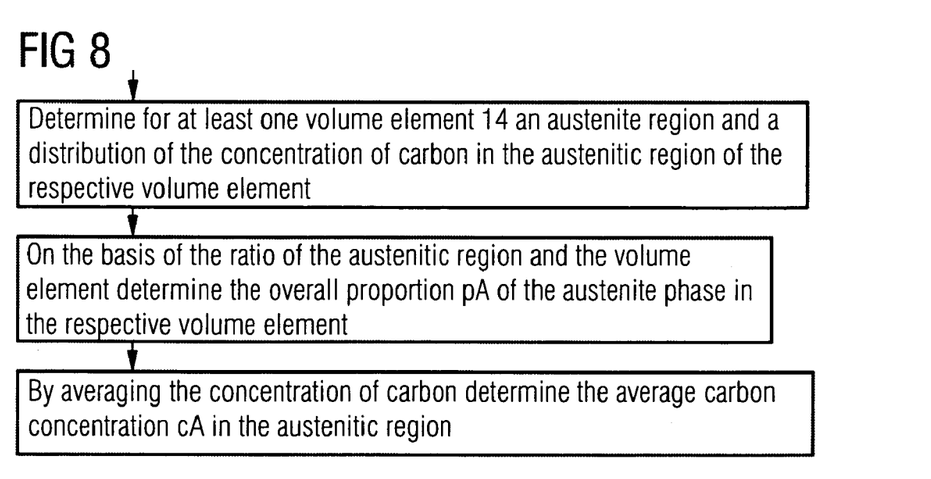

FIG. 8 shows a possible alternative implementation of step S7 of FIG. 2. In accordance with FIG. 7 the computer 1 determines within the framework of solving the phase transition equation an austenitic region and a distribution of the carbon concentration in the austenitic region of the respective volume element 14. The austenitic region and the distribution of the carbon concentration are determined in this by solving at least one Stefan problem. Based on the ratio of the austenitic region and the volume element 14 overall the computer then determines the proportion pA of the austenite phase in the volume element 14 observed. By averaging the distribution of the carbon concentration the computer 1 determines the average carbon concentration cA in the austenitic region.

For the sake of completeness it should be mentioned that the phase transition equation can be defined independently of whether the thermal conductivity equation is employed multidimensionally or one-dimensionally.

As already mentioned, it is possible for the computer 1 to execute the modeling method online and in realtime as a corresponding actual steel volume 13' passes through the influencing device 16 for thermal influencing of the actual steel volume 13'. For reasons of possible computing capacity it is thus necessary for the volume elements 14 to be of a size significantly greater than the actual particle size of the steel. This also applies if the computer 1 only acts as an observer, i.e. does not itself act to control the influencing device 16.

After the state equations have been solved in steps S6 and S7 the computer 1 determined the logical variable DONE in step S8. The logical variable DONE assumes the value "true" if the steel volume 13 in accordance with the modeling has exited from the influencing device 16. Otherwise it assumes the value "false". Depending on the logical Variable DONE the computer 1 checks in step S9 whether it is to continue at step S10 or whether it is to perform a further pass through the steps S6 to S9.

Provided the computer 1 continues with the further execution of the modeling method with step S10, it sets in step S10 an end state ZE of the modeled steel volume 13 to the last determined state Z.

In accordance with FIG. 2 steps S11 to S14 are still to be executed after step S10. These steps are only optional however.

In step S11 the computer 1 accepts an actual end state ZE' of the actual steel volume 13'. For example—see FIG. 3—a further measuring device 17' which is arranged at the end of influencing device 16, can detect an actual temperature T' of the actual steel volume 13.

In step S12 the computer 1 determines a logical variable B. The logical variable 8 assumes the value "true" if the end state ZE determined within the framework of the modeling method matches (at least approximately) the actual final state ZE'. Otherwise it assumes the value "false".

The value of the logical variable 8 is checked by the computer 1 in step S13. Depending on the value of the logical variable 8 step S14 is executed or also not executed. Within the framework of execution of step S14 the computer 1 adapts the modeling method accordingly.

The adaptation of the modeling method in accordance with steps S11 to S14 is also possible if the modeling method is not executed online and/or not in realtime. This is because, although it is possible for example to detect the actual initial states ZA' and the actual final states ZE' in realtime, these states can only be buffered. The modeling method can then be executed offline at another time.

Within the framework of the steps already described the computer 1 undertakes a pure modeling of the steel volume 13, but does not directly or indirectly control the influencing device 16. A control of this type is also possible however. For this to be done the procedure of FIG. 2 must be adapted. This is explained below in conjunction with FIG. 9. Steps S1, S2 and S11 to S14 are in this case not shown in FIG. 9. They correspond to those of FIG. 2.

Figure 9:
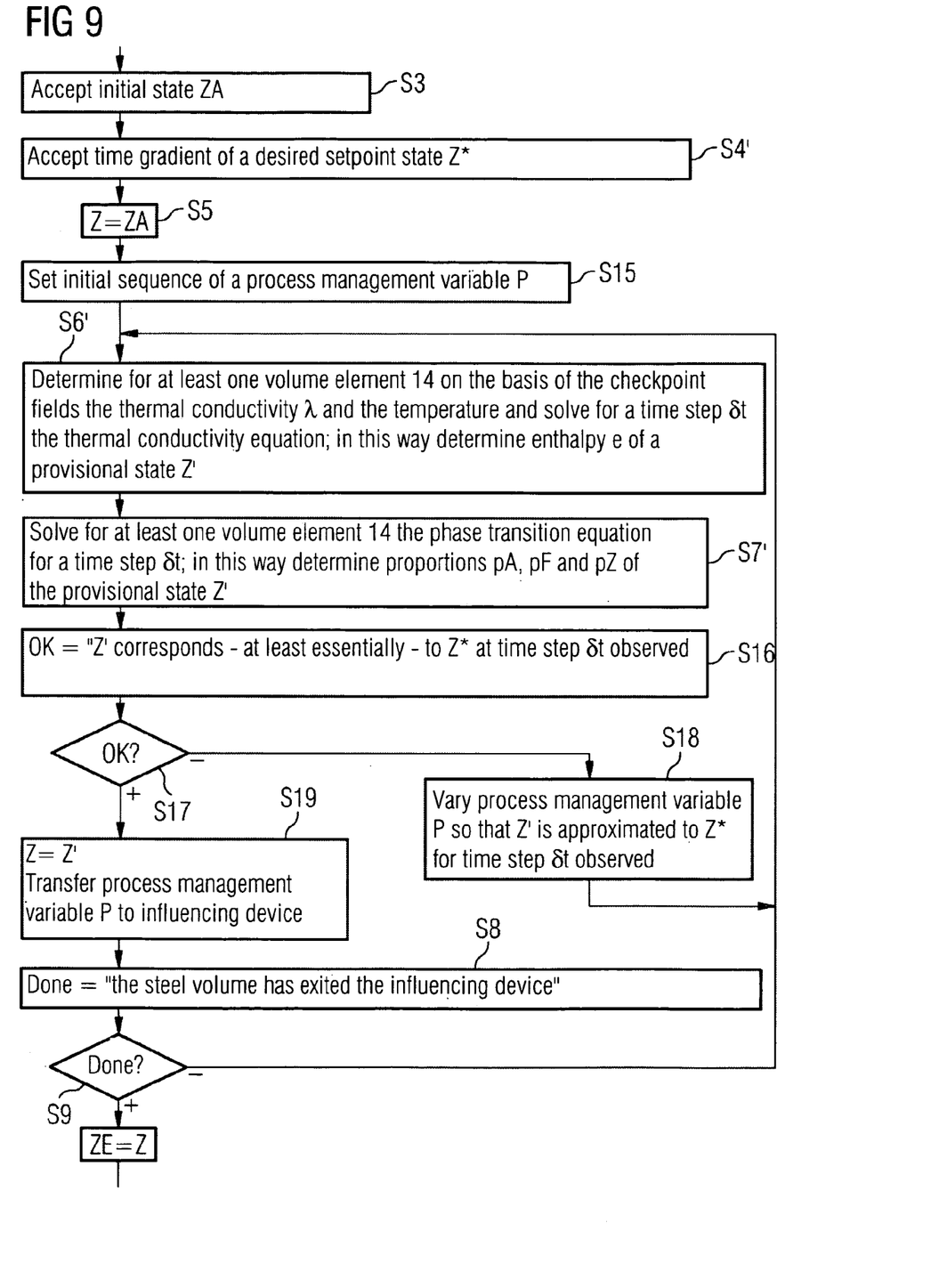

It is first of all necessary for the initial state ZA to be fed to the computer 1 via the measuring device 17 which is arranged in front of the influencing device 16. If the modeling method is to be adapted, it is also necessary, in step S11 likewise—for example by means of the measuring device 17'—to detect the actual final state ZE' of the actual steel volume 13' directly as it exits the influencing device 16.

Furthermore it is necessary in accordance with FIG. 8, to modify steps S4, S6 and S7 to steps S4', S6' and S7'. Step S4 is modified here to step S4' so that, as a peripheral condition to be considered a desired state sequence Z* is specified, for example a desired temperature gradient over time. Steps S6' and S7' essentially correspond to the following steps S6 and S7. The difference from steps S6 and S7 consists of the result determined not directly producing the new state of the modeled steel volume but only a preliminary state Z'.

But above all, in accordance with FIG. 9, steps S15 to S19 must be inserted after step S5 and after step S7'.

In step S15 the computer 1 sets an initial value for a process control variable P, with which the influencing device 16 is to act on the corresponding actual steel volume 13'. With this value of the actual influencing variable P the steps S6' and S7' are executed.

After executing step S7' the computer 1 determines a logical variable OK in step S16. The logical variable OK assumes the value "true" if the provisional state Z' determined within the framework of the execution of steps S6' and S7' matches the corresponding desired state Z* (at least essentially) for the respective time step 8*t*. Otherwise the logical variable OK assumes the value "false".

The value of the logical variable OK is checked in step S17. Depending on the value of the logical variable OK, either step S18 or step S19 will be executed. In step S18 the computer 1 varies the process execution variable P, by means of which the corresponding actual steel volume 13' is to be influenced. The variable is of course varied in such cases taking into account the provisional state Z' and the desired state Z* at the respective time step 8*t*. The program then returns to step S6'. When step S19 is executed, the computer 1 accepts the provisional state Z' as the new state Z. Furthermore it transfers the process execution variable P to the influencing device 16, so that the latter can thermally influence the corresponding actual steel volume 13' in accordance with the process execution variable P determined.

The procedure in accordance with FIG. 9 is executed online and in realtime with the passage of the corresponding actual steel volume 13' through the influencing device 16. In this case the influencing device 16 will also be controlled directly and immediately by the computer 1. It would however also be possible, instead of the direct activation of the influencing device 16 in step S19 to store the corresponding process execution variables P. In this case the computer 1 could operate offline and/or not in realtime and still control the influencing device 16, if now only indirectly.

By means of the inventive procedure—especially also taking into account the dependency of the temperature T on the proportion of carbon cA in the austenite—a significantly more simple and at the same time also better modeling is possible than in the prior art.

The invention claimed is:

1. A modeling method for a time gradient of a state of a steel volume performed by a computer when modeling the steel volume based upon a plurality of volume elements, comprising:

modeling the steel volume based upon individually modeling a number of volume elements in the steel volume; and wherein the modeling further includes providing variables for the state of the steel volume at a specific time for each of the volume elements, wherein the variables are characteristic for an enthalpy present at a specific time in the respective volume element and for proportions in which the steel in the respective volume element at the specific time is present in the phases austenite, ferrite and cementite; wherein the providing variables comprises:

providing a first characteristic variable being a locally invariable average concentration of interstitial elements within the respective volume element in the austenite phase of the respective volume element;

providing a second characteristic variable being the proportion of the phase austenite in the respective volume element; and providing a third characteristic variable being the enthalpy of the respective volume element, wherein the proportions of the phases ferrite and cementite in the respective volume element are variables derived from the characteristic variables;

and wherein the modeling further includes:

determining, by the computer, for at least one of the volume elements a time gradient of the characteristic variables by solving a thermal conductivity equation and a phase transition equation; and determining, by the computer, process management variables for influencing the state of the actual steel volume based on the modeling method and transferring them to a corresponding influencing device for thermal influencing of the actual steel volume.

2. The modeling method as claimed in claim 1, wherein for each of the plurality of volume elements variables for the state of the steel volume at a specific time are provided, wherein the modeling is performed by the computer.

3. The modeling method as claimed in claim 1, wherein the computer determines for the at least one volume element a relationship between the enthalpy and the temperature within the framework of solving the thermal conductivity equation, wherein the determination takes into account that the relationship not only depends on the proportions, but also on the concentration of interstitial elements.

4. The modeling method as claimed in claim 1, wherein the computer determines for the at least one volume element a relationship between the enthalpy and the temperature within the framework of solving the phase change equation, wherein the determination takes into account that the relationship not only depends on the proportions, but also on the concentration of interstitial elements.

5. The modeling method as claimed in claim 3, wherein the relationship between the enthalpy and the temperature is determined on the basis of the equation $$e=pAeA(T)+pFeF(T)+pZeZ(T),$$

with pA, pF and pZ being the proportions in which the steel in the at least one volume element is present in the phases austenite, ferrite and cementite, and with eA, eF and eZ being functions which in each case describe a relationship between the enthalpy and the temperature in the at least one volume element for the case in which the volume element is exclusively present in the phase austenite, ferrite or cementite respectively.

6. The modeling method as claimed in claim 5, wherein account is taken, for the function eA, of the fact that the relationship between the enthalpy and the temperature in the austenite phase also depends on the concentration of interstitial elements in the austenite phase as such.

7. The modeling method as claimed in claim 4, wherein the relationship between the enthalpy and the temperature is determined based upon a equation $$e=pAeA(T)+pFeF(T)+pZeZ(T),$$

with pA, pF and pZ being the proportions in which the steel in the at least one volume element is present in the phases austenite, ferrite and cementite, and with eA, eF and eZ being functions which in each case describe a relationship between the enthalpy and the temperature in the at least one volume element for the case in which the volume element is exclusively present in the phase austenite, ferrite or cementite respectively.

8. The modeling method as claimed in claim 7, wherein account is taken, for the function eA, of the fact that the relationship between the enthalpy and the temperature in the austenite phase also depends on the concentration of interstitial elements in the austenite phase as such.

9. The modeling method as claimed in claim 1, wherein the computer determines for a plurality of values of the characteristic variables the relationship between the enthalpy and the temperature before the modeling of the time gradient of the state of the steel volume and stores the relationship as a checkpoint field, and wherein the computer, within the framework of the modeling of the time gradient of the state of the steel volume, determines the temperature obtaining in the at least one volume element with reference to the checkpoint field.

10. The modeling method as claimed in claim 1, wherein the computer determines for a plurality of values of the characteristic variables a relationship between the enthalpy and the thermal conductivity even before the modeling of the time gradient of the state of the steel volume and stores the relationship as a checkpoint field, and wherein the computer, within the framework of the modeling of the time gradient of the state of the steel volume, determines the thermal conductivity in the at least one volume element on the basis of the checkpoint field.

11. The modeling method as claimed in claim 1, wherein the thermal conductivity equation in a multidimensional or one-dimensional case takes the form $$\frac{\partial e}{\partial t} - div\left[\frac{\lambda}{\rho} \cdot gradT\right] = \frac{\partial Q}{\partial t} \text{ or } \frac{\partial e}{\partial t} - \frac{\partial}{\partial x}\left[\frac{\lambda}{\rho} \cdot \frac{\partial T}{\partial x}\right] = \frac{\partial Q}{\partial t},$$

with $\lambda$, being the thermal conductivity of the at least one volume element, p the density of the steel and Q a thermal quantity which is created in the at least one volume element by outside influences caused by an influencing device for influencing temperature.

12. The modeling method as claimed in claim 1, wherein the computer determines, within the framework of solving the phase transition equation, the Gibbsean free enthalpies of the phases austenite, ferrite and cementite, on the basis of:

the Gibbsean free enthalpies transition rates of the phases austenite, ferrite and cementite, and on the basis of the transition rates the proportions of the phases austenite, ferrite and cementite.

13. The modeling method as claimed in claim 1, wherein the computer, within the framework of solving the phase transition equation, determines an austenitic region and a distribution of a concentration of the interstitial elements in the austenitic region of the at least one volume element by solving at least one Stefan problem for the at least one volume element, wherein the computer determines overall the proportion of the austenite phase based upon the relationship of the austenitic region and of the at least one volume element, wherein the average concentration of interstitial elements in the austenite phase is deteimined based upon averaging the distribution of the concentration of interstitial elements in the austenitic region of the at least one volume element.

14. The modeling method as claimed in claim 1, wherein the computer executes the modeling method online and in realtime with a passage of the corresponding actual steel volume through an influencing device for thermal influences of the actual steel volume.

15. The modeling method as claimed in claim 14, wherein an actual temperature of the actual steel volume detected after the thermal influencing of the actual steel volume is fed to the computer, and wherein the computer compares the actual temperature with the corresponding temperature determined within the framework of the modeling method and adapts the modeling method accordingly.

16. The modeling method as claimed in claim 1, wherein an actual temperature of the actual steel volume detected after the thermal influencing of the actual steel volume is fed to the computer, and wherein the computer compares the actual temperature with the corresponding temperature determined within the framework of the modeling method and adapts the modeling method accordingly.

17. A computer readable medium encoded with a computer program for a method executable by a computer when modeling a steel volume, comprising:
- modeling a steel volume based on a number of volume elements;
- providing variables for the state of the steel volume at a specific time for the volume elements, wherein the variables are characteristic for the enthalpy present at the specific time in the respective volume element and for proportions in which the steel in the respective volume element at the specific time is present in the phases austenite, ferrite and cementite; wherein providing variables comprises
  - providing a first characteristic variable being a locally invariable average concentration of interstitial elements within the respective volume element in the austenite phase of the respective volume element;
  - providing a second characteristic variable being the proportion of the phase austenite in the respective volume element; and
  - providing a third characteristic variable being the enthalpy of the respective volume element, wherein the proportions of the phases ferrite and cementite in the respective volume element are variables derived from the characteristic variables;
- determining for at least one of the volume elements a time gradient of the characteristic variables by solving a thelinal conductivity equation and a phase transition equation; and
- determining process management variables for influencing the state of the actual steel volume based on the modeling method and transferring them to a corresponding influencing device for thermal influencing of the actual steel volume.

18. A computer modeling a time gradient of a state of a steel volume, comprising:
- a storage device to store a computer program, wherein the computer provides an execution of the computer program, wherein the computer program is for
- modeling the steel volume based on the computer by a number of volume elements,
- providing variables for the state of the steel volume at a specific time for the volume elements, wherein the variables are characteristic for the enthalpy present at the specific time in the respective volume element and for proportions in which the steel in the respective volume element at the specific time is present in the phases austenite, ferrite and cementite, wherein providing variables comprises
  - providing a first characteristic variable being a locally invariable average concentration of interstitial elements within the respective volume element in the austenite phase of the respective volume element,
  - providing a second characteristic variable being the proportion of the phase austenite in the respective volume element, and
  - providing a third characteristic variable being the enthalpy of the respective volume element, wherein the proportions of the phases ferrite and cementite in the respective volume element are variables derived from the characteristic variables;
- determining, by the computer, for at least one of the volume elements a time gradient of the characteristic variables by solving a thermal conductivity equation and a phase transition equation via the computer; and
- deteimining, by the computer, process management variables for influencing the state of the actual steel volume based on the modeling method and transferring them to a corresponding influencing device for thermal influencing of the actual steel volume.

\* \* \* \* \*